United States Patent [19]
Sobina

[11] Patent Number: 5,820,149
[45] Date of Patent: Oct. 13, 1998

[54] WHEEL SUSPENSION ASSEMBLY

[75] Inventor: Roman Sobina, Hoppers Crossing, Australia

[73] Assignee: Workman Industries PTY Limited, Nowra, Australia

[21] Appl. No.: 799,060

[22] Filed: Feb. 10, 1997

Related U.S. Application Data

[62] Division of Ser. No. 408,617, Mar. 22, 1995, Pat. No. 5,630,693.

[30] Foreign Application Priority Data

Mar. 22, 1994 [AU] Australia ................................ PM 4619
Aug. 24, 1994 [AU] Australia ................................ PM 7612

[51] Int. Cl.$^6$ .................................................. B60G 5/04
[52] U.S. Cl. ................................ 280/124.128; 280/124.1; 280/124.17
[58] Field of Search .................................... 414/471, 474, 414/476, 480, 482, 484, 485, 495, 540; 280/718, 680, 686, 682

[56] References Cited

U.S. PATENT DOCUMENTS

| | | | |
|---|---|---|---|
| 1,893,695 | 1/1933 | Chenoweth | 280/682 |
| 2,151,870 | 3/1939 | Raven . | |
| 2,361,323 | 10/1944 | Seghers | 280/718 X |
| 3,024,931 | 3/1962 | Grover . | |
| 3,378,277 | 4/1968 | Gadd | 280/718 X |
| 4,003,583 | 1/1977 | Stanzel . | |
| 4,033,606 | 7/1977 | Ward et al. | 280/686 X |
| 4,058,325 | 11/1977 | Schramm . | |
| 4,061,353 | 12/1977 | Kingman et al. . | |
| 4,155,471 | 5/1979 | Yancy . | |
| 4,344,642 | 8/1982 | Goth | 280/686 X |
| 4,502,707 | 3/1985 | Jable et al. | 280/682 |
| 4,673,328 | 6/1987 | Shiels . | |
| 4,902,188 | 2/1990 | Page . | |
| 5,209,518 | 5/1993 | Heckenliable et al. . | |
| 5,288,197 | 2/1994 | Harris . | |
| 5,395,202 | 3/1995 | Peters . | |
| 5,433,578 | 7/1995 | Honan . | |

FOREIGN PATENT DOCUMENTS

| | | | |
|---|---|---|---|
| 70142/91B | 8/1992 | Australia . | |
| 0 245 104 A2 | 11/1987 | European Pat. Off. . | |
| 381496 | 8/1990 | European Pat. Off. | 280/686 |
| 3812924 | 10/1989 | Germany | 280/718 |
| 56-99833 | 8/1981 | Japan . | |
| 464 233 B | 3/1991 | Sweden . | |
| 2034644 | 6/1980 | United Kingdom | 280/718 |
| 2 125 348 | 3/1984 | United Kingdom . | |
| WO 86/03168 | 6/1986 | WIPO . | |

OTHER PUBLICATIONS

Patent Abstracts of Japan, M295, p. 142.
Patent Abstracts of Japan, M 6181, p. 77.

*Primary Examiner*—James W. Keenan
*Attorney, Agent, or Firm*—Townsend and Townsend and Crew LLP

[57] ABSTRACT

A wheel suspension assembly includes first and second trailing arms (28, 29) pivotally suspended from the chassis (2) at one end and to a stub axle (26, 27) at the other end. The stub axles are each pivotally mounted to the center of a leaf spring (40). The opposed ends of the leaf springs are connected by a pair of links (37, 41), one link (37) being supported at its center by a pivot at the distal end of a bracket (36) extending from the chassis.

6 Claims, 12 Drawing Sheets

WHEEL SUSPENSION ASSEMBLY

This is a Division of Application Ser. No. 08/408,617, filed Mar. 22, 1995, now U.S. Pat. No. 5,630,693, the disclosure of which is incorporated by reference.

BACKGROUND OF THE INVENTION

The present invention relates to vehicles either non powered such as trailers or powered such as pick up trucks, trucks and vans, having a vertically adjustable bed.

Standard vehicles such as vans or trucks have been used for the transportation of cargo. However, because of the height of the tray or bed above the ground, loading, unloading and positioning of cargo can be difficult.

In practice, devices such as fork lifts, lifting tailgates and ramps are used. These however have their disadvantages such as costs and availability at any particular site.

Attempts to overcome the above disadvantages have been made utilizing either pivoting trays or adjustable trays in which parallelogram linkages are employed.

With the pivoting type trays such as is shown in U.S. Pat. No. 5,288,197, the back end of the tray is pivoted to the ground, forming a ramp up which the load is driven, in the case of vehicles, or pushed. This method of loading is not always convenient due to the problems of the loading onto an inclined ramp.

Adjustable trays have been proposed as shown in Australian Patent 57 3414 and Australian Patent Application 70142/91. In both of these specifications, parallelogram linkages in the form of "dog leg" or "boomerang" linkages are used, with the power means or rams acting on the linkages normal to the displacement of the tray. Further in both of these specifications the tray swings to a position rearway of the back of the vehicle, which could present problems in use. In U.S. Pat. No. 4,673,328 again a parallelogram type linkage is used having four pivotable tracks.

The construction shown in Australian Patent Application No. 70142/91 utilizes a complicated chassis construction with a torque box, rollover bar and support bars required to give stability to the yoke shaped chassis.

SUMMARY OF THE INVENTION

The present invention seeks to ameliorate the disadvantages of the prior art by providing a vehicle comprising
a tray having posts parallel to each other extending from the tray;
a yoke or U-shaped chassis having side wall extending substantially normal to the plane of the chassis;
parallel elongated members located in such side walls,
drive means to move said bed between a transport position and a loading position such that said tray retains substantially the same orientation throughout its movement between said transportation position and said loading position, with said elongated members being telescopically engaged with respective posts of the tray.

Preferably the elongated members and said posts are respectively normal to said yoke shaped chassis and said tray.

In another broad form the invention comprises a wheel assembly adapted for connection to a chassis comprising:
a first trailing arm pivotally suspended from a first end to the chassis;
a first wheel mounting stub axle located at or adjacent the free end of the first trailing arm;
a first connection means located adjacent said first wheel mounting stub axle;
a second trailing arm pivotally suspended, from a first end, to the chassis and angled with respect to the chassis in the direction as the first trailing arm;
a second wheel mounting stub axle located at or adjacent the free end of the second trailing arm;
a second connection means located adjacent said second wheel mounting stub axle;
a first bracket located on the chassis intermediate the said first and second trailing arms;
a second bracket located on the chassis on one side of the first bracket beyond said first wheel mounting stub axle;
a third bracket located on the other side of said first bracket beyond said second wheel mounting stub axle;
a pivoting linkage connected to said first bracket and extending on each side thereof;
a first leaf spring connected between one end of said pivoting linkage and said second bracket with said first connection means from said first connection means from said first trailing arm connected to the middle of said first leaf spring; and
a second leaf spring connected between the other end of said pivoting linkage and said third bracket, with said second connection means connected to the middle of said second leaf spring.

In a further form the invention comprises a hydraulic control mechanism for a vehicle which has a yoke or U-shaped chassis, with a tray moveably supported thereon, which tray is moveable between a transport position and a loading position, with the tray remaining substantially horizontal during movement, comprising:
four hydraulic cylinders located adjacent the corners of the vehicle chassis to raise and lower the tray between the transport and the loading positions;
a hydraulic motor;
a hydraulic fluid sump;
a spool valve;
a first fluid line connected from said sump via said motor to said spool valve;
a second fluid line connected from said spool valve to said sump;
a third fluid line connected from said spool valve to a first flow divider/combiner which passes fluid through a first outlet to a second flow divider/combiner, and through a second outlet to a third flow divider/combiner, wherein each outlet of the second and third flow dividers/combiners is connected to one side of a respective one of said four hydraulic cylinders;
a fourth flow divider/combiner having a first and a second inlet, and an outlet;
a fifth flow divider/combiner having a first and second inlet and an outlet, with each inlet of said fourth and fifth flow dividers/combiners being connected to the other side of one of the respective cylinders;
a sixth flow divider/combiner having two inlets and an outlet, with its inlets each being connected to a respective outlet of said fourth and said fifth flow dividers/combiners, and its outlet being connected to said spool valve,
wherein said spool valve has a first position to allow fluid to flow in a first direction through the said flow dividers/combiners to move the pistons simultaneously to lower the tray, and second position to allow fluid to flow in a second direction through the said flow dividers/combiners to move the pistons simultaneously to raise the tray.

BRIEF DESCRIPTION OF THE DRAWINGS

The invention will now be described with reference to the accompanying drawings in which.

DESCRIPTION OF THE PREFERRED EMBODIMENTS

Figure 1:
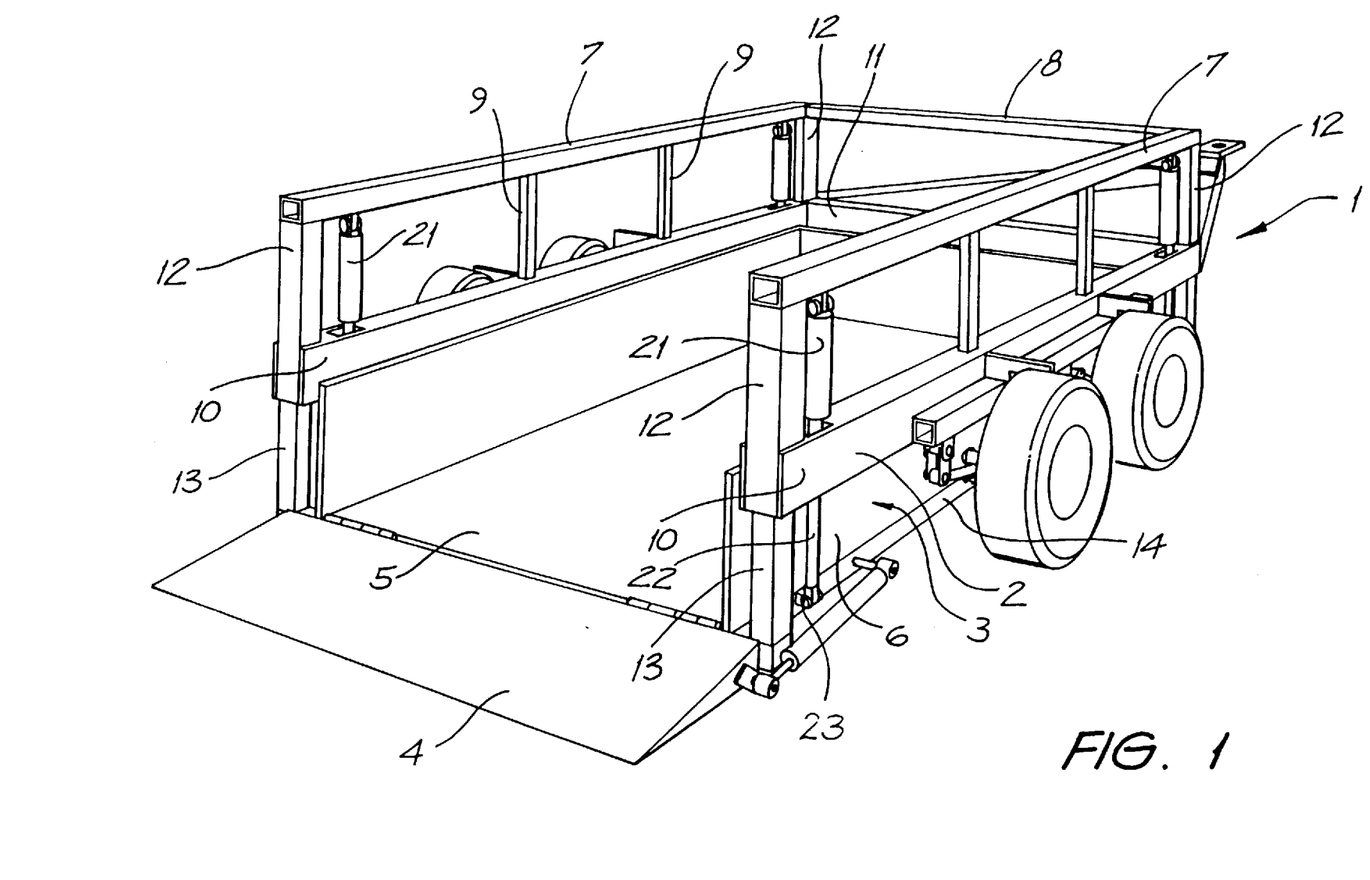
FIG. 1 illustrates a rear view of a trailer with the bed in a loading position made in accordance with an embodiment of the present invention.
Figure 2:
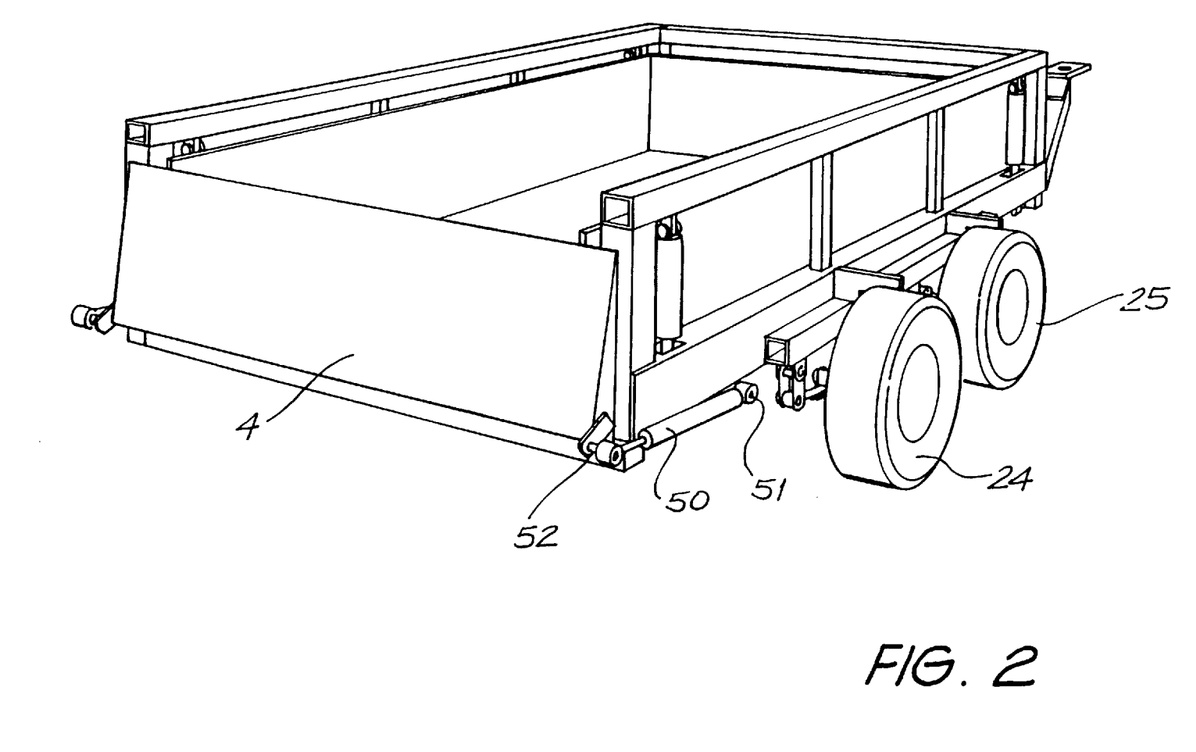
FIG. 2 illustrates another rear view of the trailer shown in FIG. 1 with the bed in the transport position.

A trailer is shown schematically in FIGS. 1 and 2 embodying the present invention. The trailer (1) comprises a yoke-shaped chassis (2) and a drop tray (3). A tailgate (4) is located at the rear of the trailer (1); the tailgate (4) being hingedly connected to the side wall (6) or to the drop tray decking (5).

Thus in use the tailgate is unlatched and can be either swung to the side or dropped or lifted out, and then the drop tray (3) is lowered or dropped to the ground. However, as shown in FIGS. 1 and 2 the tailgate (4) is hingedly connected to the tray floor (5).

Figure 3:
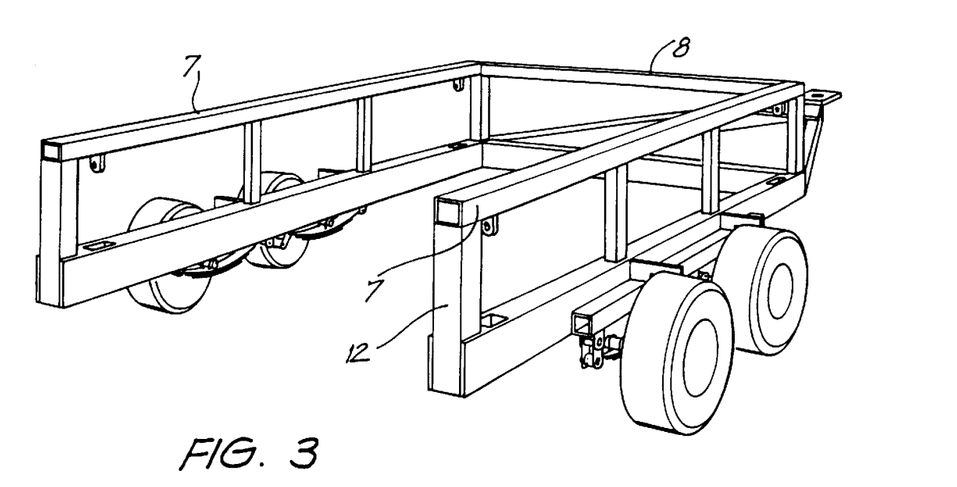
FIG. 3 illustrates a view of the chassis shown in FIGS. 1 and 2.

The chassis (2) as shown FIGS. 1, 2 & 3 comprises two top rails (7) joined by a top end rail (8). Reinforcing struts (9) link the top rails (7) and (8) to identical bottom side rails (10) and bottom end rails (11) respectively. Located at each corner of the chassis (2) are hollow tubes (12) which are adapted to telescopically mate with the upright post (13) of the tray (3). Suitable cladding (not shown) is placed on the outer surface forming a stable side wall.

Figure 4:
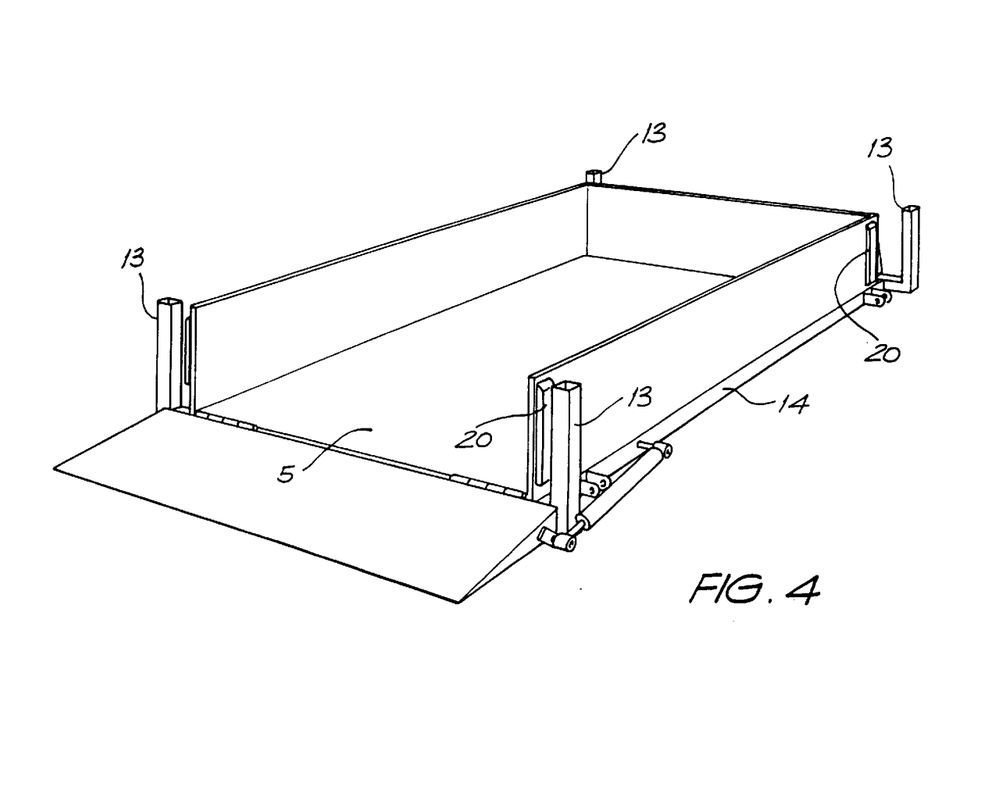
FIG. 4 illustrates a view of the tray shown in FIGS. 1 and 2.
Figure 9:
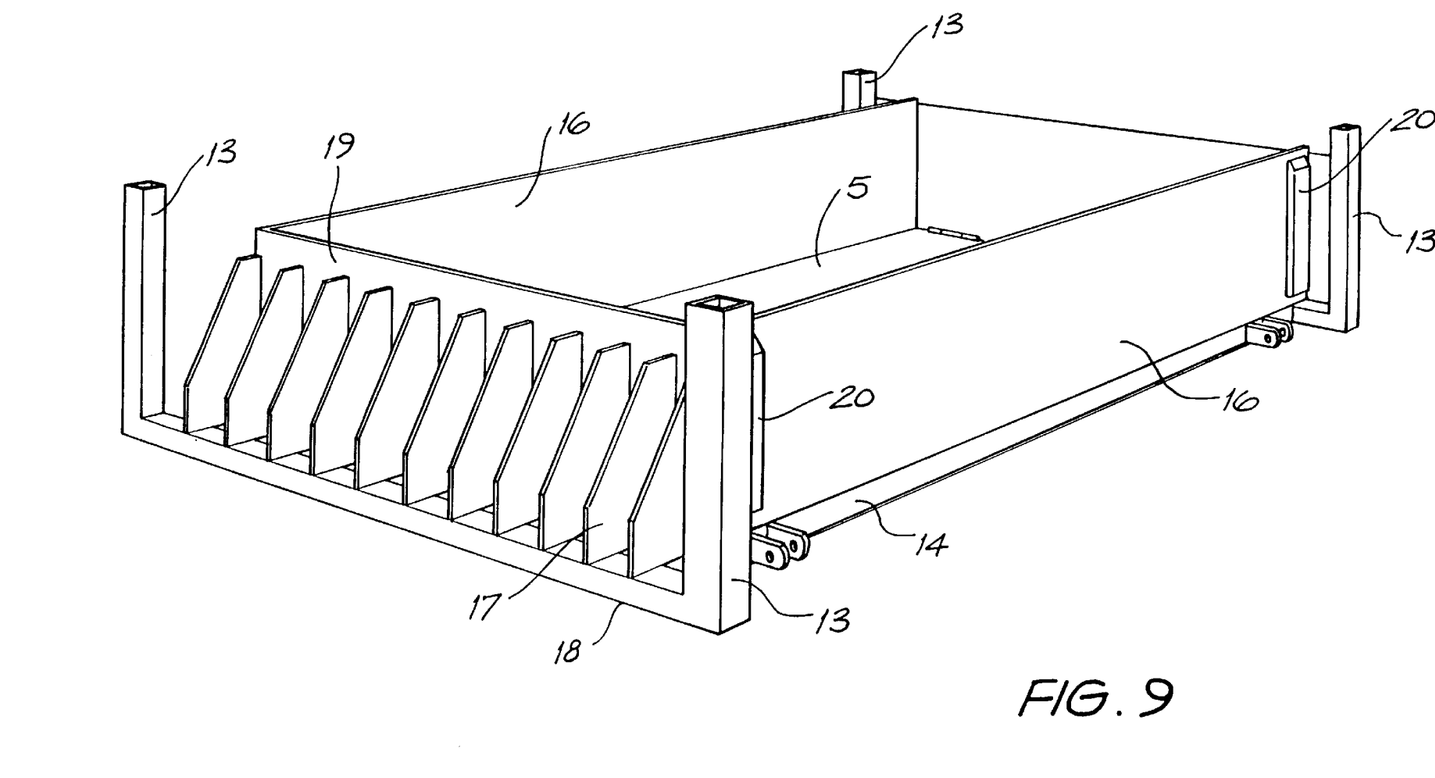
FIG. 9 illustrates the front view of the tray illustrated in FIG. 4.

A drop tray (3) is constructed as shown in FIGS. 4 & 9, having two side members (14) joined by traverse members (not shown), with a decking (5) secured across on top. Upright posts (13) extend normal to the plane of the drop tray decking (5). A sheet (16) is connected normal to the decking (5) a distance away from the posts (13).

As shown in FIG. 9 gussets (17) are connected across the last two traverse members (18) and the back plate (19).

Figure 5:
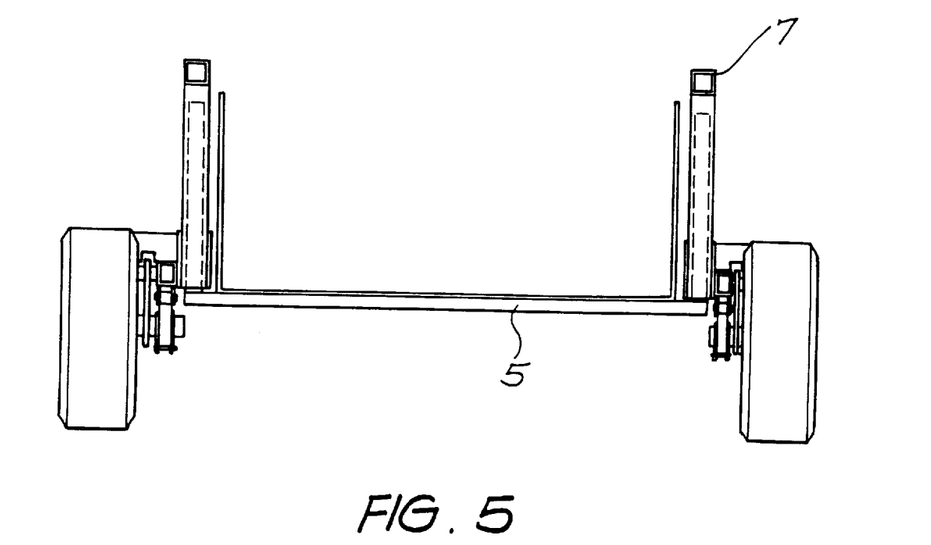
FIG. 5 illustrates a schematic rear view of a tray shown in FIG. 4 in its transport position.
Figure 6:
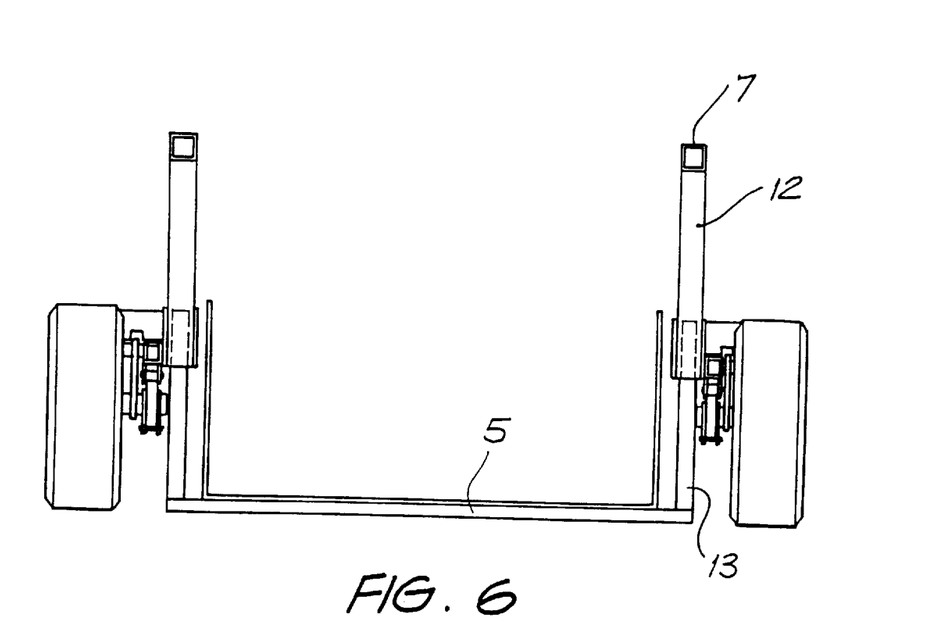
FIG. 6 illustrates a schematic rear view of the tray illustrated in FIG. 4 in its loading position.

The posts (13), in use, engage telescopically with the hollow tubes (12) as shown in FIGS. 1, 5 & 6. The side sheet (16) as shown in FIG. 4 has nylon strips (20) located thereon to act as a bearing strip against the hollow tube (12).

As can be seen from this embodiment there is a hollow side tube (12) located on each corner of the yoke shaped chassis (2). In each of these tubes (12), a post (13) engages. This engagement enhances the rigidity of the vehicle.

To operate the tray (3), from its transport position to its ground engaging loading position, any suitable lifting means could be used such as motor driven thread and fixed nut arrangements, or cables. However, preferably as shown in FIGS. 1 and 2, hydraulic cylinders (21) are connected to the side rail (7) and have their cylinder rod (22) passing through the bottom side rail (10) to engage with the side member (14) of the tray (2) at connection (23). A hydraulic cylinder (21) is located adjacent the four corners of the frame.

Thus to raise or lower the drop tray (2) the cylinders are activated simultaneously raising and lowering the tray (2) parallel to the plane of the chassis.

It is not necessary that the posts (13) and hollow tubes (12) be normal to the frame, as they could be at any suitable angle such as 45° to move the tray (2) rearward of the vehicle.

Further the male post could be on the chassis with the female hollow members on the tray.

An operating system will be described subsequently.

An improved suspension/wheel mounting system has been developed, an embodiment of which is shown in FIGS. 1, 2, 3, 7 and 8.

This system utilizes two wheels (24) and (25) on each side of the chassis (2). Each wheel (24) and (25) is connected to a stub axle (26) and (27) respectively, extending from a trailing arm (28) and (29) which are pivotally connected to a support rail (15) attached to the bottom rail (10). Extending opposite the stub axles (26) and (27) at the free ends of the trailing arms (28) and (29) are projections (30) and (31). These projections are pivotally secured by any suitable means such as U-bolts (32) backing plate (33) and nuts (34) to the respective leaf springs (35).

Figure 7:
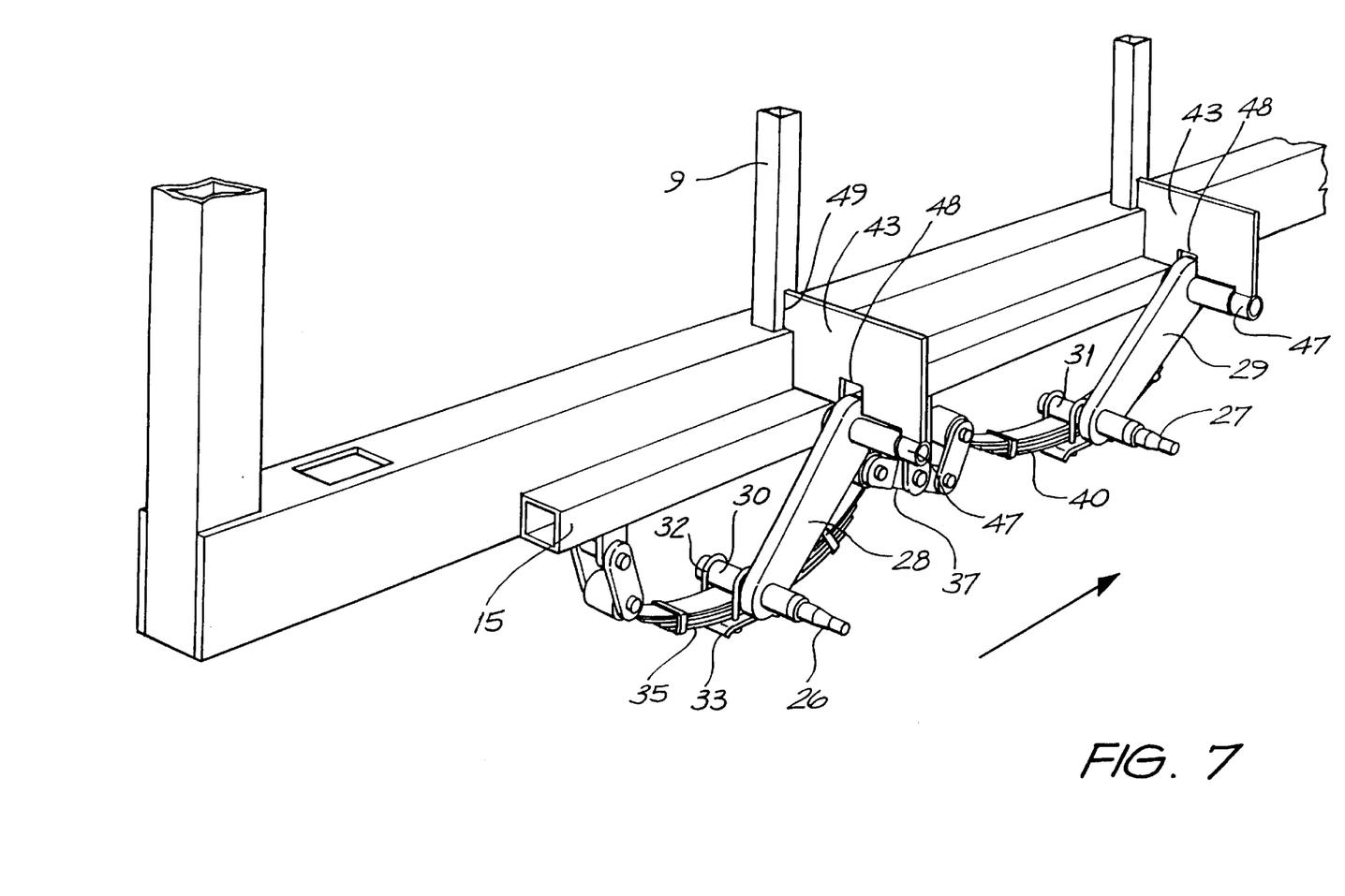
FIG. 7 illustrates a detailed view of the chassis of FIGS. 1 and 2, showing the wheel suspension assembly.
Figure 8:
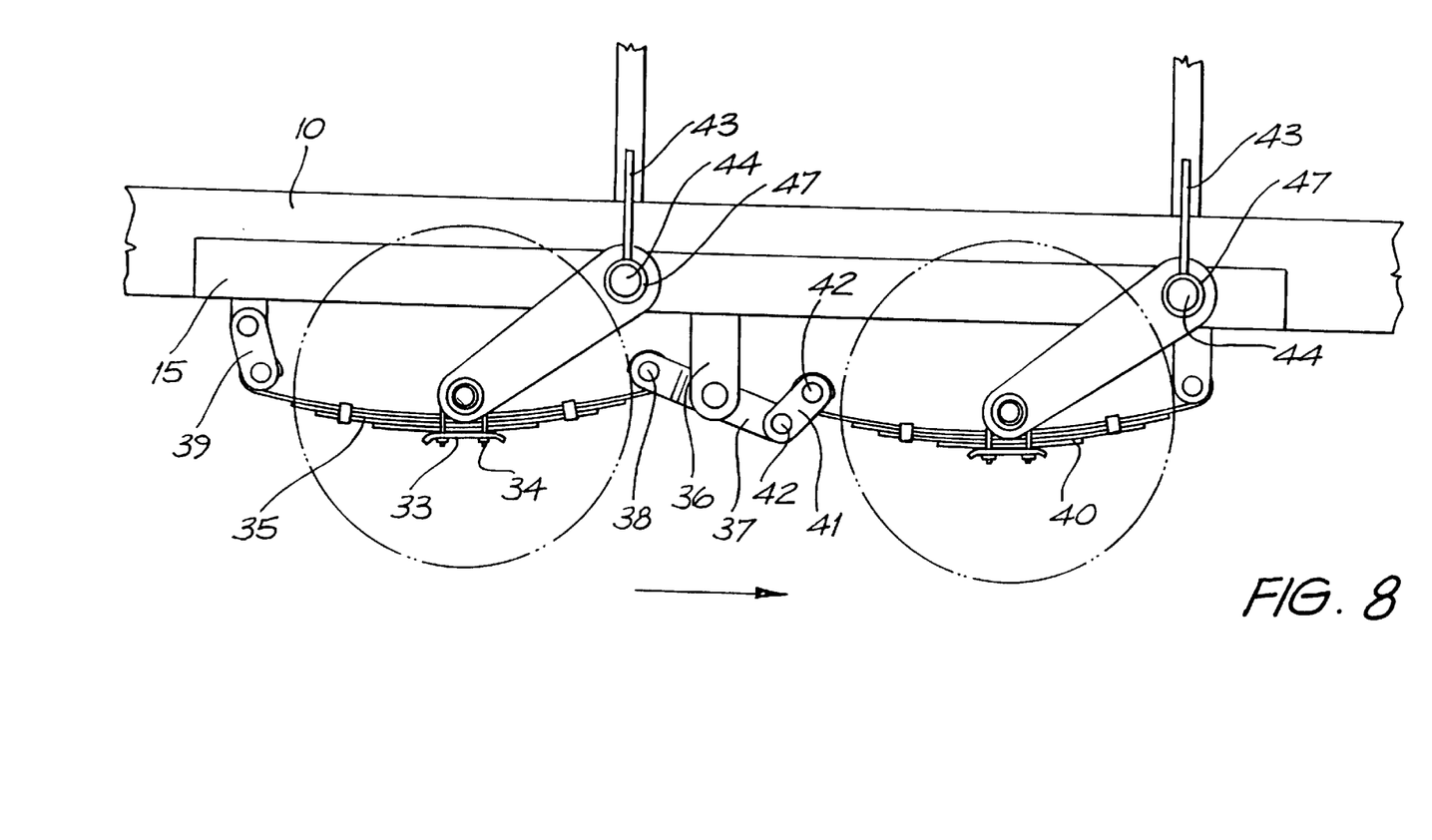
FIG. 8 illustrates a side view of the wheel suspension assembly of FIG. 7.

Located intermediate the trailing arms (28) and (29) is a bracket (36) connected to the support rail (15). A first linkage (37) is pivotally connected intermediate its ends to the bracket (36). A first end (38) is pivotally connected to one end of the leaf spring (35), while the other end of the leaf spring (35) is connected by a pivotal linkage (39) to the support rail (15).

The second leaf spring (40) is pivotally connected at one end to the support rail (15) and connected at the other end by pivotal linkage (41) to the second end (42) of the first linkage (37).

To transfer weight back to the chassis (2) a support plate (43) is provided as particularly shown in FIGS. 7 and 8. The trailing arms (28) and (29) are mounted on a respective projection (44) with a bush and spacer (not shown). The support plate (43) has located at one end tubular section (47) which fits over the free end of the projection (44), with the cut out (48) accommodating the trailing arm (28), as shown in FIG. 7. The edge (49) of the support plate (43) is welded to the reinforcing struts (9), thus securing the trailing arm (28) and transferring the load back to the chassis (2).

Figure 16:
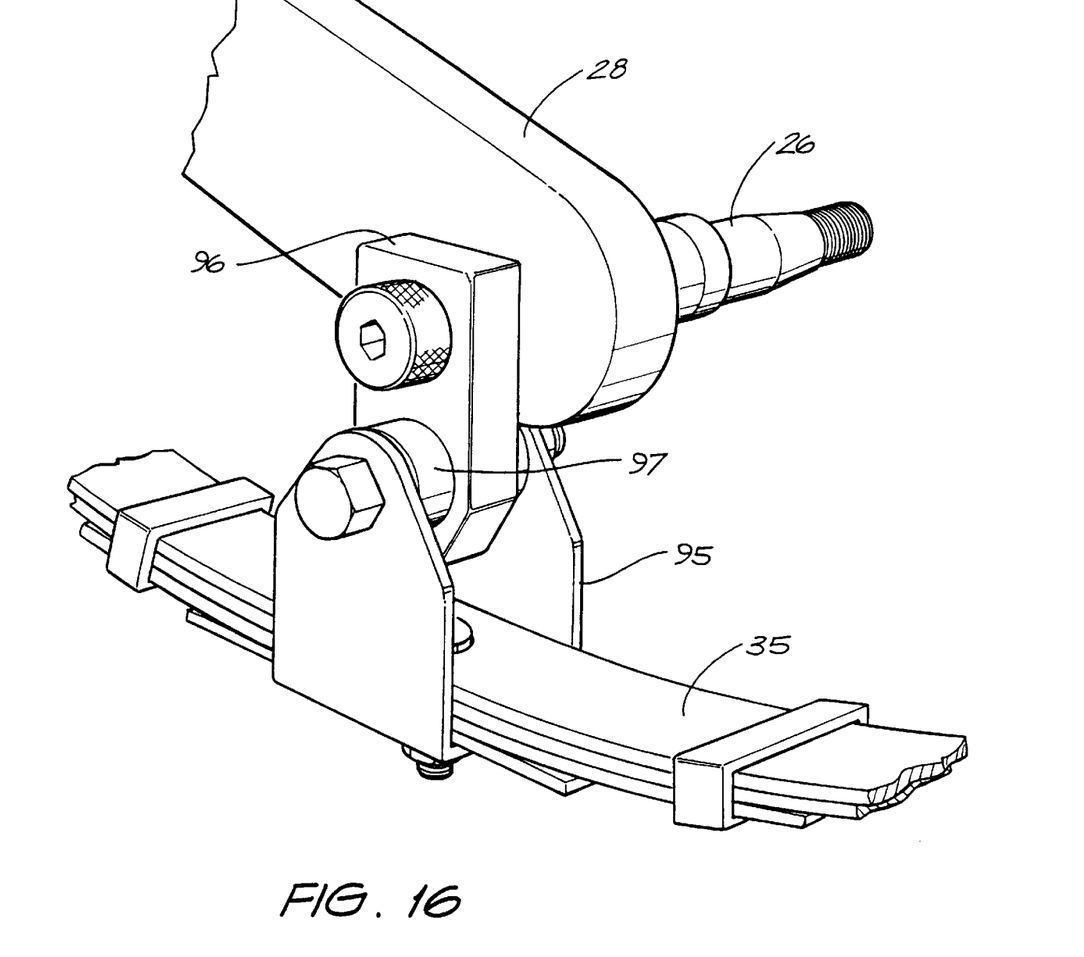
FIG. 16 illustrates another embodiment of the trailing arm and suspension system.

A modified suspension system is shown in FIG. 16 wherein a detailed view of the suspension connection to the trailing arm is shown.

The arrangement of the wheel suspension is as described previously, except that the leaf spring (35) are at their centres supported by a spring holder (95), which is supported on a bearing (97) to the member (96) which is secured to the trailing arm (28).

The tailgate (4) is raised and lowered by the tailgate cylinder (50) which is connected to the tray (3) by connection (51) and to the linkage (52) on the tail gate (4) as shown in FIG. 1.

Figure 10:
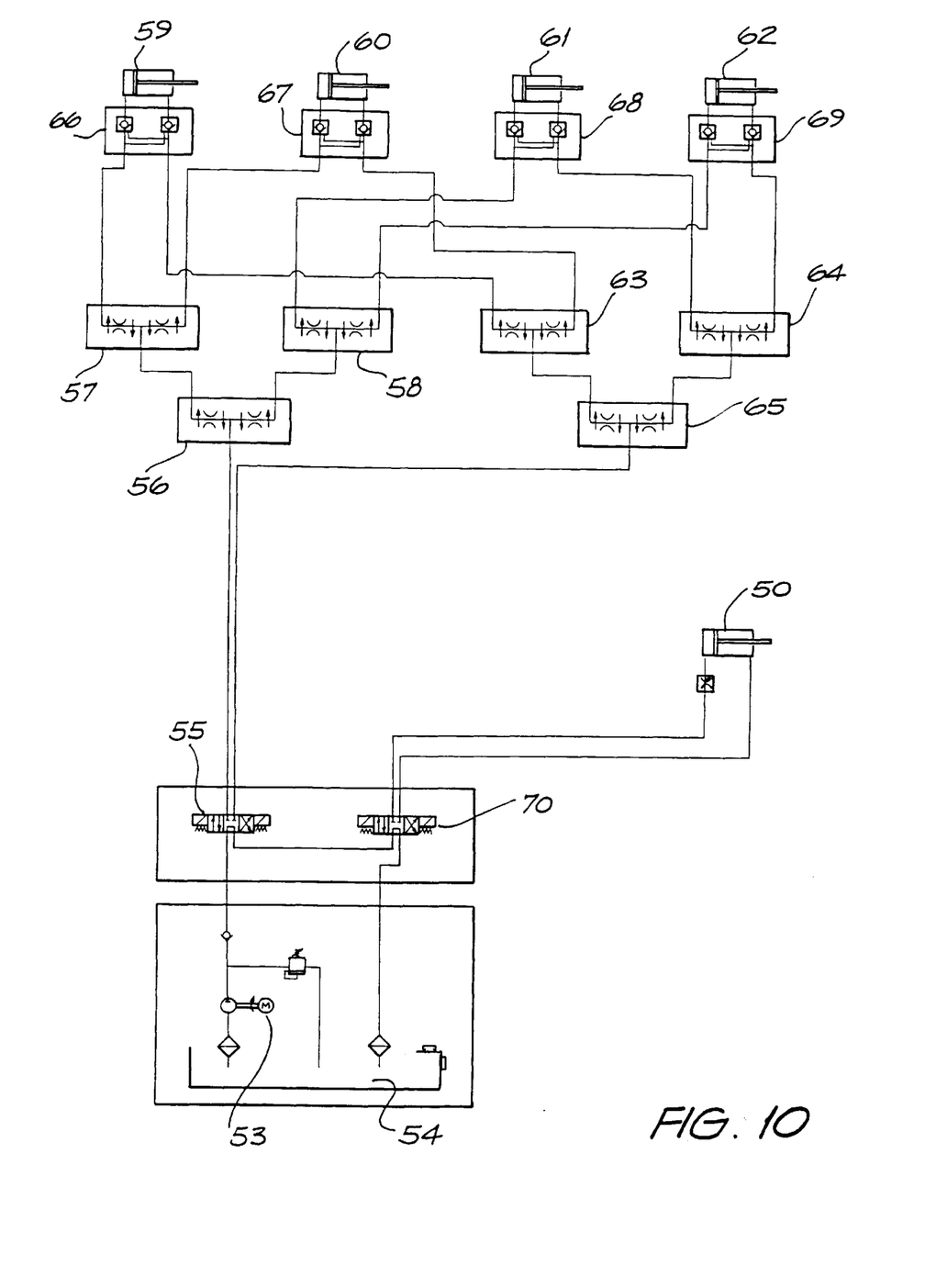
FIG. 10 illustrates the hydraulic system according to one embodiment of the present invention.

FIG. 10 is a schematic of the hydraulic system of one embodiment of the present invention. A hydraulic motor (53) draws fluid from the sump (54) and pumps it to a solenoid spool valve (55). In a first position the spool valve (55) passes fluid through to a first flow divider/combiner (56) such as those sold under the trade mark Hydraform, which has two outlets dividing the flow to two further flow dividers/combiners (57) and (58). The flow dividers/combiners being set to equally distribute the flow. The output of each of the flow dividers/combiners (57) and (58) communicates with the power side or extension side of a respective tray operating cylinder (59, 60, 61 and 62), with the return side or retraction side of the cylinders being connected to respective inputs of flow divider/combiners (63) to (64), the outputs of which are combined through the flow divider/combiner (65) and back into the sump (54). The spool valve (55) has a second position wherein the flow is reversed through the flow dividers and the pistons are retracted.

Pilot check valves (66, 67, 68 and 69) can be connected directly to the cylinders (59, 60, 61 and 62) as shown or a single pilot check valve (not shown) can be connected between the flow dividers (56 and 57) and the spool valve (55).

To operate the tailgate cylinder (50) an additional spool valve (70) is connected via the spool valve (55) to the hydraulic motor drive fluid, to open or close the tailgate depending on the position of the spool valve (70).

Figure 11:
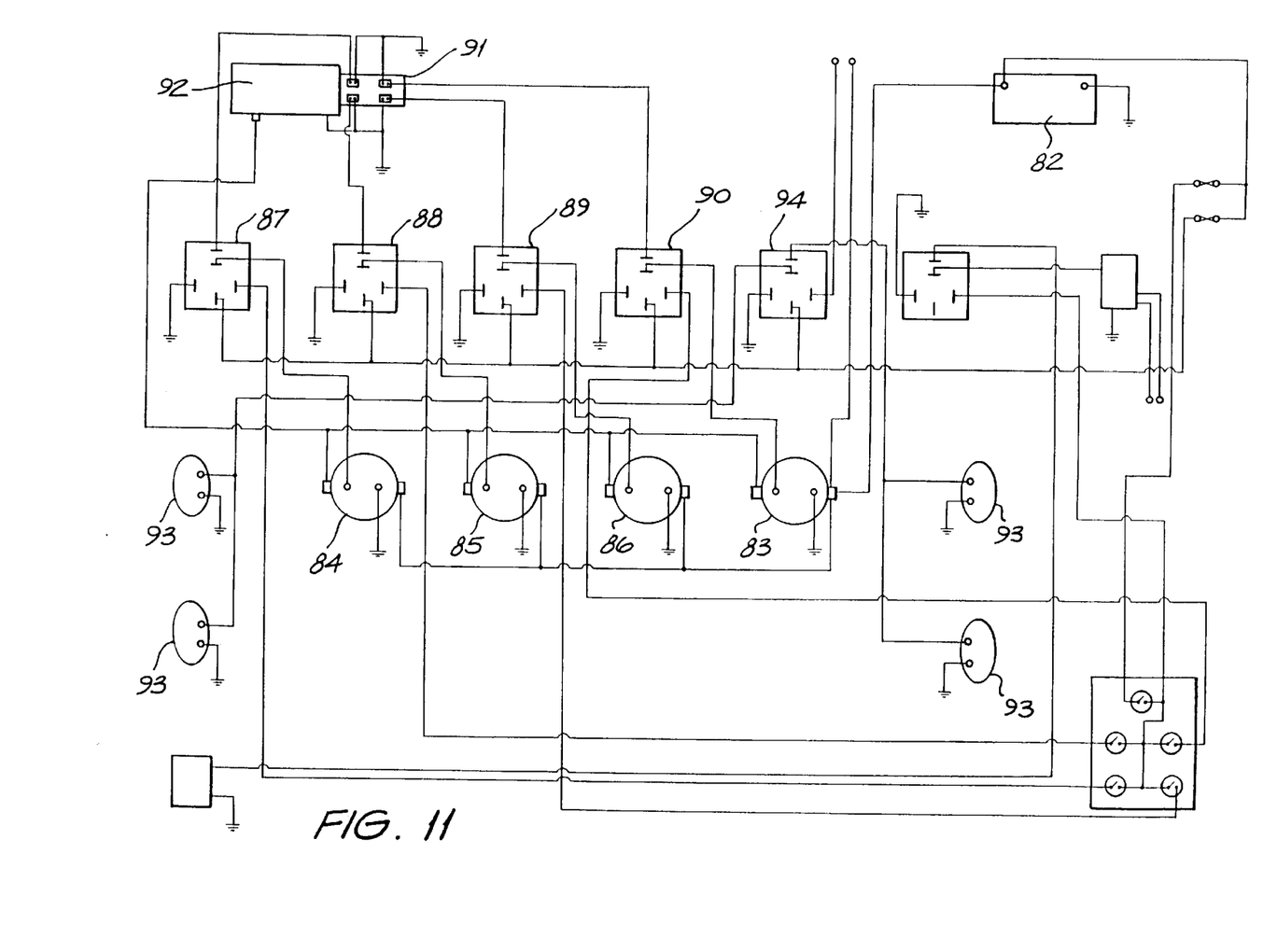
FIG. 11 illustrates the electrical system according to one embodiment of the present invention.

Shown in FIG. 11 is the electrical schematic circuitry. As can be seen the trailer is self powered having its own battery. The circuitry provides a provision for direct charging of the trailer battery (82) from the car to which it is connected.

The floor down solenoid (84), floor up solenoid (85), tailgate down solenoid (86), and tailgate up solenoid (83) are connected via the respective floor down relay (87), floor up relay (88), tailgate down relay (89) and tailgate up relay (90) to the hydraulic valves (91) located next to the hydraulic motor (92).

The wheels each have an electric brake (93) operated by the electric brake relay (94).

Separate locking mechanisms are provided to lock the tray in its transport position. This can utilize any suitable arrangement coupled with a fail safe system to prevent operation of the tray if the tray is still locked to the chassis.

Further, in the line to the tailgate cylinder, is a pressure sensitive valve whereby if an object is blocking the closing of the tailgate the increase in resistance to the movement of the ram is detected and the ram is disabled until the object is removed.

The basis chassis construction can be used with many different body panel designs. One embodiment is shown in FIG. 12 in which storage units (71) are rigidly connected to the chassis (2) and the support plates (43), to provide additional rigidity of the chassis (2).

Figure 12:
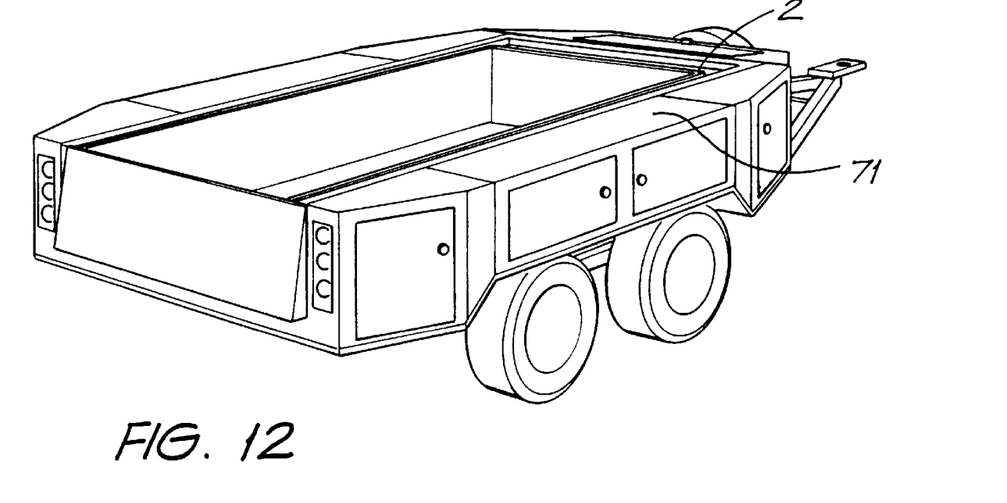
FIGS. 12 to 15 illustrate various configurations of trailers made in accordance with embodiments of the present invention.
Figure 13:
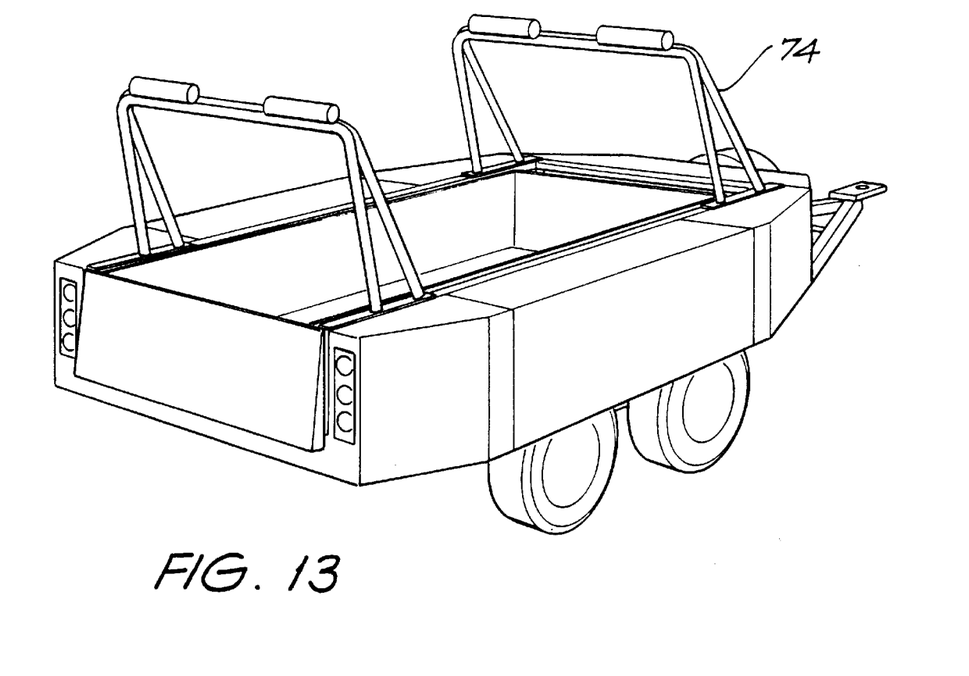
Figure 14:
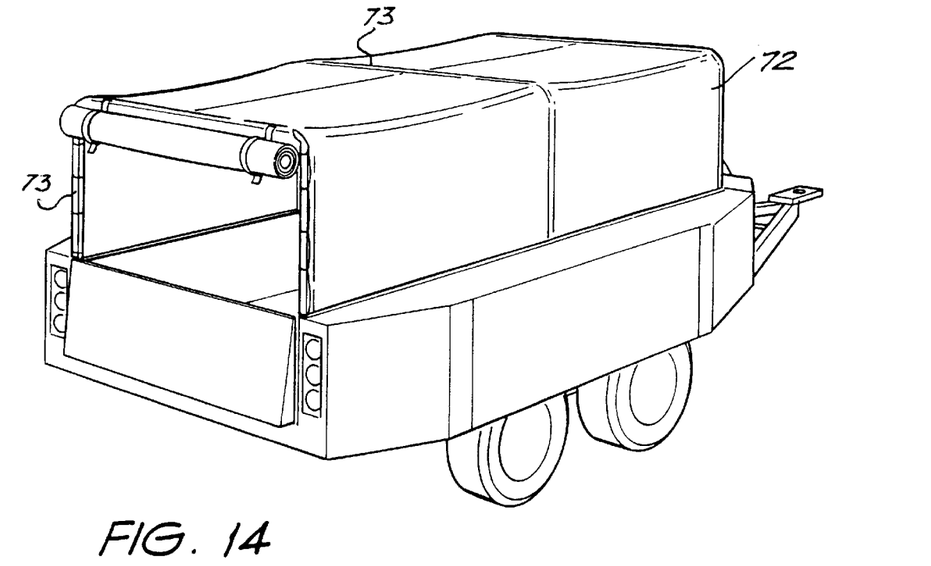

The trailer (1) as shown in FIG. 12 can be modified to include a canopy (72) covering a framework (73) as shown in FIG. 14, or a carrying rack (74) as shown in FIG. 13.

Figure 15:
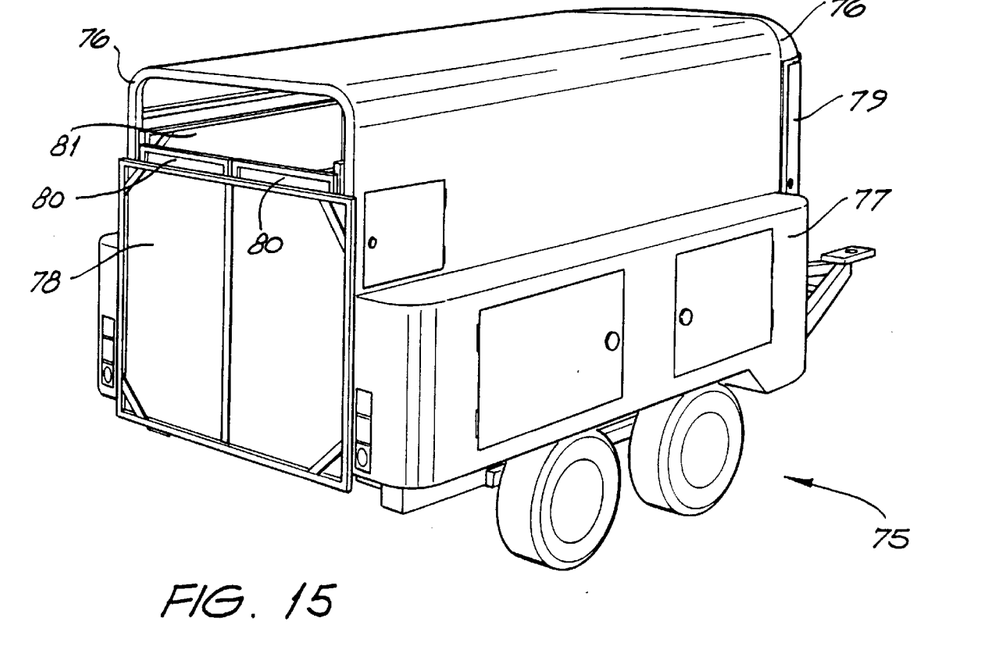

The basic trailer chassis can be modified to produce a horse float (75) as shown in FIG. 15. The operation of the tray is identical to the previously described operation, and the trailer chassis and wheel suspension systems are substantially identical to these described previously.

The addition of the roof bracing (76) and the storage units (77) which are also connected to the support plates (43) resist any twisting of the horse float (75). The horse float body has a back entrance door (78) and a front door (79).

The tray is divided into two stalls with appropriate horse padding on the divider and side walls (81). Each stall has its own rear door (80).

It should be obvious that modifications and alterations could be made to the above described invention without departing from the scope or spirit of the present invention.

I claim:

1. A wheel suspension assembly for connection to a chassis comprising:
    a first trailing arm, comprising first and second ends, said first trailing arm pivotally suspended from said first end to the chassis;
    a first wheel mounting stub axle located at or adjacent the second end of the first trailing arm;
    a first connection means located adjacent said first wheel mounting stub axle;
    a second trailing arm, comprising first and second ends, pivotally suspended from said first end to the chassis and angled with respect to the chassis in the same direction as the first trailing arm;
    a second wheel mounting stub axle located at or adjacent the second end of the second trailing arm;
    a second connection means located adjacent said second wheel mounting stub axle;
    a first bracket located on the chassis intermediate the said first and second trailing arms;
    a second bracket pivotally connected to the chassis on the one side of the first bracket beyond said first wheel mounting stub axle;
    a third bracket located on the chassis on the other side of said first bracket beyond said second wheel mounting stub axle;
    a pivoting linkage connected to said first bracket and extending on each side thereof;
    a first leaf spring pivotally connected between one end of said pivoting linkage and said second bracket with said first connection means of said first trailing arm connected to the middle of said first leaf spring; and
    a second leaf spring pivotally connected between the other end of said pivoting linkage and said third bracket, with said second connection means of said second trailing arm connected to the middle of said second leaf spring.

2. A wheel suspension assembly according to claim 1, wherein said first connection means is pivotally connected to a fourth bracket which is connected to the middle of the said first leaf spring and said second connection means is pivotally connected to a fifth bracket which is connected to the middle of the said second leaf spring.

3. A wheel suspension assembly for connection to a chassis comprising:
    a first trailing arm, comprising first and second ends, said first trailing arm pivotally suspended from said first end to the chassis;
    a first wheel mounting stub axle located at or adjacent the second end of the first trailing arm;
    a first connection means located adjacent said first wheel mounting stub axle;

a second trailing arm, comprising first and second ends, pivotally suspended from said first end to the chassis and angled with respect to the chassis in the same direction as the first trailing arm;

a second wheel mounting stub axle located at or adjacent the second end of the second trailing arm;

a second connection means located adjacent said second wheel mounting stub axle;

a first bracket located on the chassis intermediate the said first and second trailing arms;

a second bracket located on the chassis on the one side of said first bracket beyond said first wheel mounting stub axle;

a third bracket located on the chassis on the other side of said first bracket beyond said second wheel mounting stub axle;

a pivoting linkage connected to said first bracket and extending on each side thereof;

a first leaf spring connected between one end of said pivoting linkage and said second bracket with said first connection means of said first trailing arm connected to the middle of said first leaf spring;

a second leaf spring connected between the other end of said pivoting linkage and said third bracket, with said second connection means of said second trailing arm connected to the middle of said second leaf spring; and wherein each trailing arm is pivoted on a shaft whose free end is engaged by a support plate which is fixedly attached to the chassis.

4. A wheel suspension assembly according to claim 3, wherein said first connection means is pivotally connected to a fourth bracket which is pivotally connected to the middle of the said first leaf spring and said second connection means is pivotally connected to a fifth bracket which is pivotally connected to the middle of the said second leaf spring.

5. A wheel suspension assembly for connection to a chassis comprising:

a first trailing arm, comprising first and second ends, said first trailing arm pivotally suspended from said first end to the chassis;

a first wheel mounting stub axle located at or adjacent the second end of the first trailing arm;

a first connection means located adjacent said first wheel mounting stub axle;

a second trailing arm, comprising first and second ends, pivotally suspended from said first end to the chassis and angled with respect to the chassis in the same direction as the first trailing arm;

a second wheel mounting stub axle located at or adjacent the second end of the second trailing arm;

a second connection means located adjacent said second wheel mounting stub axle;

a first bracket located on the chassis intermediate the said first and second trailing arms;

a second bracket located on the chassis on the one side of said first bracket beyond said first wheel mounting stub axle;

a third bracket located on the chassis on the other side of said first bracket beyond said second wheel mounting stub axle;

a pivoting linkage connected to said first bracket and extending on each side thereof;

a first leaf spring connected between one end of said pivoting linkage and said second bracket with said first connection means of said first trailing arm connected to the middle of said first leaf spring;

a second leaf spring connected between the other end of said pivoting linkage and said third bracket, with said second connection means of said second trailing arm connected to the middle of said second leaf spring; and wherein each trailing arm is pivoted on a shaft whose free end is engaged by a support plate which is fixedly attached to a reinforcing strut on the chassis.

6. A wheel suspension assembly according to claim 5, wherein said first connection means is pivotally connected to a fourth bracket which is pivotally connected to the middle of the said first leaf spring and said second connection means is pivotally connected to a fifth bracket which is pivotally connected to the middle of the said second leaf spring.

* * * * *